United States Patent
Kuo et al.

(10) Patent No.: US 9,305,075 B2
(45) Date of Patent: Apr. 5, 2016

(54) EXTENDING DYNAMIC MATRICES FOR IMPROVED SETUP CAPABILITY AND RUNTIME SEARCH PERFORMANCE OF COMPLEX BUSINESS RULES

(75) Inventors: Justin H. Kuo, Redwood City, CA (US); Hui-Lim Victor Lim, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1048 days.

(21) Appl. No.: 12/474,982

(22) Filed: May 29, 2009

(65) Prior Publication Data

US 2010/0306262 A1 Dec. 2, 2010

(51) Int. Cl.
G06F 7/00 (2006.01)
G06F 17/00 (2006.01)
G06F 17/30 (2006.01)

(52) U.S. Cl.
CPC ................................ *G06F 17/30595* (2013.01)

(58) Field of Classification Search
None
See application file for complete search history.

(56) References Cited

U.S. PATENT DOCUMENTS

| | | | | |
|---|---|---|---|---|
| 6,018,742 | A * | 1/2000 | Herbert, III | |
| 2002/0194149 | A1 * | 12/2002 | Gerber et al. | 707/1 |
| 2003/0217046 | A1 * | 11/2003 | Yuan et al. | 707/3 |
| 2004/0098383 | A1 * | 5/2004 | Tabellion et al. | 707/3 |
| 2005/0038784 | A1 * | 2/2005 | Zait et al. | 707/5 |
| 2005/0050074 | A1 * | 3/2005 | Jain et al. | 707/100 |
| 2005/0065982 | A1 * | 3/2005 | Bailey et al. | 707/104.1 |
| 2005/0149344 | A1 * | 7/2005 | Wachholz-Prill | 705/1 |
| 2006/0167929 | A1 * | 7/2006 | Chakraborty et al. | 707/102 |
| 2007/0150447 | A1 * | 6/2007 | Shah et al. | 707/3 |
| 2008/0086446 | A1 * | 4/2008 | Zhang et al. | 707/2 |
| 2008/0091491 | A1 * | 4/2008 | Thorpe et al. | 705/7 |
| 2008/0140696 | A1 * | 6/2008 | Mathuria | 707/102 |

OTHER PUBLICATIONS

Jacob Anhoj; Generic Design of Web-Based Clinical Databases;Journal of Medical Internet Research; 2003. pp. 1-12.*

* cited by examiner

*Primary Examiner* — Mariela Reyes
*Assistant Examiner* — Jermaine Mincey
(74) *Attorney, Agent, or Firm* — Sheppard Mullin Richter & Hampton LLP

(57) ABSTRACT

A mechanism by which rule attributes of varying types and numbers can be stored and searched in an efficient manner is provided by storing attribute values of each rule in a child table of a parent rule table. The child table is normalized and contains a foreign key pointing back to the parent rule table and has attribute-value pairs as table columns of the child table. Each rule is then represented by one row of the parent rule table and one or more corresponding rows of the child rule details table. A variable and unlimited number of attribute dimensions is supported among the rules, and search performance is improved through the use of database indexes on the rule details table attribute columns. Metadata representing the structure of the child rule details table will identify the data attributes for each dimension.

22 Claims, 7 Drawing Sheets

| | 430 | 440 | 445 | 450 | 460 | 470 |
|---|---|---|---|---|---|---|
| | RDID | PRID | AttrID | String | Number | Date |
| | 0 | 0 | Item | Shirt | | |
| | 1 | 0 | Color | Red | | |
| | 2 | 0 | Size | Large | | |
| | 3 | 0 | StartDate | | | 1/1/00 |
| | 4 | 0 | EndDate | | | 12/31/00 |
| | 5 | 0 | Price | | 10.00 | |
| | 6 | 1 | Item | Shirt | | |
| | 7 | 1 | Color | Blue | | |
| | 8 | 1 | Size | Small | | |
| | 9 | 1 | StartDate | | | 1/1/00 |
| | 10 | 1 | EndDate | | | 12/31/00 |
| | 11 | 1 | Price | | 8.00 | |
| | 12 | 2 | Item | Pants | | |
| | 13 | 2 | Fabric | Denim | | |
| | 14 | 2 | StartDate | | | 2/1/00 |
| | 15 | 2 | EndDate | | | 2/10/00 |
| | ... | | | | | |

| RID | Str0 | Str1 | Str2 | Str3 | ... | Str9 | Num0 | Num1 | ... | Num9 | Date0 | Date1 | ... | Date9 |
|---|---|---|---|---|---|---|---|---|---|---|---|---|---|---|
| 0 | Shirt | Red | Large | | | | 10.00 | | | | 1/1/00 | 12/31/00 | | |
| 1 | Shirt | Blue | Small | | | | 8.00 | | | | 1/1/00 | 12/31/00 | | |
| 2 | Pants | | | Denim | | | 31.00 | | | | 2/1/00 | 2/10/00 | | |
| 3 | Pants | | | Denim | | | 40.00 | | | | 2/11/00 | 2/28/00 | | |
| ... | | | | | | | | | | | | | | |
| 100 | Jacket | | Reg | Leather | | | 100.00 | 42 | | | | | | |

Figure 3 (Prior Art)

| PRID | Rule Header |
|---|---|
| 0 | A0001010100 |
| 1 | A0002010100 |
| 2 | A0003020100 |
| 3 | A0004021100 |
| ... | |
| 100 | A0101050100 |

Figure 4A

| RDID | PRID | AttrID | String | Number | Date |
|---|---|---|---|---|---|
| 0 | 0 | Item | Shirt | | |
| 1 | 0 | Color | Red | | |
| 2 | 0 | Size | Large | | |
| 3 | 0 | StartDate | | | 1/1/00 |
| 4 | 0 | EndDate | | | 12/31/00 |
| 5 | 0 | Price | | 10.00 | |
| 6 | 1 | Item | Shirt | | |
| 7 | 1 | Color | Blue | | |
| 8 | 1 | Size | Small | | |
| 9 | 1 | StartDate | | | 1/1/00 |
| 10 | 1 | EndDate | | | 12/31/00 |
| 11 | 1 | Price | | 8.00 | |
| 12 | 2 | Item | Pants | | |
| 13 | 2 | Fabric | Denim | | |
| 14 | 2 | StartDate | | | 2/1/00 |
| 15 | 2 | EndDate | | | 2/10/00 |
| ... | | | | | |

Figure 4B

EXTENDING DYNAMIC MATRICES FOR IMPROVED SETUP CAPABILITY AND RUNTIME SEARCH PERFORMANCE OF COMPLEX BUSINESS RULES

FIELD OF THE INVENTION

Embodiments of the present invention relate generally to the field of automated rules-based decision making and, specifically, to a mechanism for providing efficient storage and search of rules used by a rules-based decision-making process.

BACKGROUND OF THE INVENTION

Many business applications implement rule-based systems to model problems of storing and retrieving fact data in a form of attribute-based rules. Rules used by business applications of a business entity are stored, and then, as input data sets are entered, the rule attributes are searched for a match to provide results. A searchable rule can have any number of attributes of variable formats (e.g., strings, numbers, and dates), but typically sets of rules share similar attributes. A collection of rules and their attributes are storable as a multi-dimensional matrix structure, where attributes define the dimensions of the matrix.

A business entity can have rules of varying numbers and types of attributes, depending upon needs of the applications associated with the rules. In the past, a business entity could define dynamic matrices to store and provide these rules of varying numbers and types of attributes. But, the actual database tables storing such rule matrices would have a fixed number of columns to store the attributes. If the fixed number of columns of the storage table is too low, the database table cannot adequately capture all the attributes of complex, multi-dimensional rules. But if the number of columns of the storage table is too high, space can be wasted by allocating a large portion of storage for extra attributes (or dimensions) that are not used for a majority of the rules stored in the table. An additional issue with typical rule attribute database tables is that the table columns are of a fixed data type, so a table can only model a fixed number of attributes of a given format. For example, a rule attribute table could have a maximum of 30 attributes per table: 10 strings, 10 numbers, and 10 dates. Such limitations of storage of rule attribute types also limits the nature and types of rules that can be used by a business entity and its business applications.

It is therefore desirable that a rules-based decision-making system provide dynamic matrices for storage of rules that permit rules to be of any number of attributes and flexible enough to specify that any attribute dimension be of any data type. It is further desirable that the rules data be stored in an efficient manner in database tables so as to not waste unnecessary space and to also support fast searching of rule attributes across large volumes of rules data.

SUMMARY OF THE INVENTION

Embodiments of the present invention provide dynamic matrices for a rules-based decision-making system that permit rule definitions having any number of attributes and which is flexible enough that any attribute dimension can be of any data type. Embodiments of the present invention provide for searching a rule details table for one or more entries comprising attributes matching a search request and identifying a rule corresponding to the search parameters using a result of the searching. Embodiments of the present invention further provide for the searching to be performed using search parameters of the search request wherein the rule details table includes one rule attribute per rule detail table entry. Each entry of the rule details table has a corresponding entry in a parent rules table. Aspects of the present invention provide that each entry of the rule details table has allocated space for values of one of each of a plurality of data types and each entry comprises one rule attribute value stored in one of the allocated spaces.

BRIEF DESCRIPTION OF THE DRAWINGS

The present invention may be better understood, and its numerous objects, features and advantages made apparent to those skilled in the art by referencing the accompanying drawings.

FIG. 3 illustrates an example of a prior art rules table that illustrates some of the deficiencies of the prior art.

FIGS. 4A and 4B illustrate an example of rules tables usable by embodiments of the present invention.

DETAILED DESCRIPTION

Embodiments of the present invention provide a mechanism by which rule attributes of varying types and numbers can be stored and searched in an efficient manner. Embodiments of the present invention provide such functionality by storing attribute values of each rule in a child table to a parent rule table. Such child tables are normalized and contain a foreign key pointing back to the parent rule table and have attribute-value pairs as table columns of the child table. Each rule is then represented by one row of the parent rule table and one or more corresponding rows of the child rule details table. Embodiments of the present invention can support a variable and unlimited number of attribute dimensions among the rules, as well as improving search performance through the use of database indexes on the rule details table columns. Embodiments of the present invention can provide for the child rule details table to include three columns to store the separate rule attributes values, one for each data type: string, number, or date. Metadata representing the structure of the child rule details table will include a field identifying the data type for each dimension. Embodiments of the present invention can generate database indexes of the child rule details table, including, for example, an index for each data type column of the rule details table.

Through the use of a child rule details table, embodiments of the present invention can reduce the amount of space allocated for storing rules with attributes, since for each entry of the child rule details table only two column entries will be empty. This is in comparison to the traditional methods discussed above in which each rule entry could have many more empty allocated storage areas. For example, in a rules database table having 30 columns divided among fixed data types, the table cells could be empty for any given rule. Embodiments of the present invention further improve search speed for finding rules corresponding to a given set of attributes by providing a small number of indexes corresponding to the attribute type columns.

Embodiments of the present invention can be used in systems that require rules-based decision making. Such rules-based decision making can be found in a variety of environments, including, for example, pricing, invoicing, and customer resource management. Rule-based decision making provides a business entity with flexibility in automating a variety of tasks. For example, in a pricing environment, rules can be provided to determine prices of a variety of items defined by the item characteristics (e.g., color, size, type) and to take into account date-related discounts, and the like. In another example, rule-based decision making in a customer response management environment can provide rules-based scripting in response to customer input that can lead to solutions or identification of appropriate products, and the like.

Figure 1:
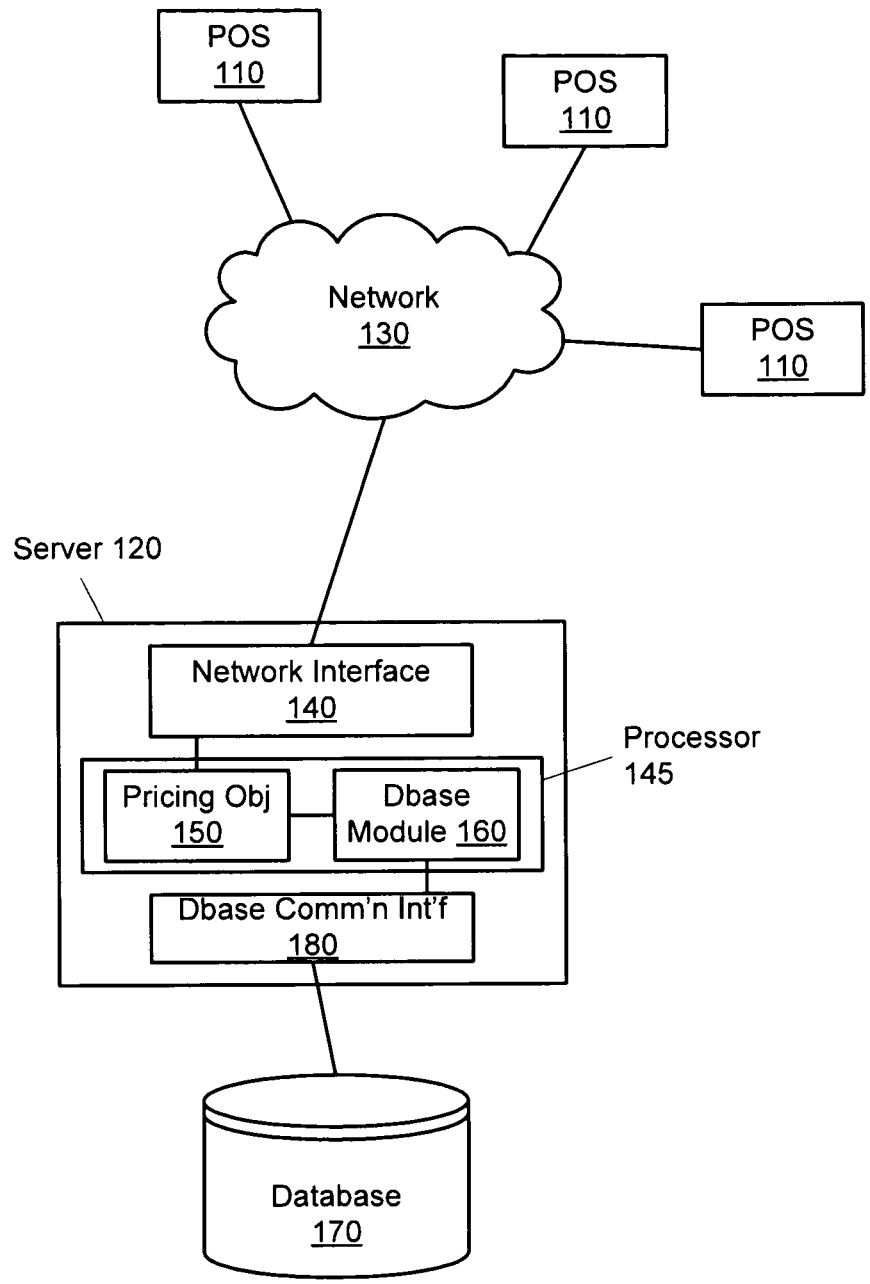
FIG. 1 is a simplified block diagram illustrating a point-of-sale architecture environment usable in conjunction with embodiments of the present invention.

FIG. 1 is a simplified block diagram illustrating a point-of-sale architecture environment usable in conjunction with embodiments of the present invention. The illustrated point-of-sale architecture environment includes a set of one or more point-of-sale terminals 110 coupled to a point-of-sale server 120 via a communications network 130. Point-of-sale terminals 110 can include a variety of input devices sufficient to identify characteristics associated with rules setting prices for those items. Point-of-sale terminals 110 communicate that information to point-of-sale server 120 via communications network 130. Communications network 130 can be a local area network (e.g., within a store), a metro-area network, or a wide area network (e.g., coupling a number of stores to a central location that physically provides point-of-sale server 120). Communications network 130 can also provide such communications over a variety of protocols, and embodiments of the present invention are not limited to any particular network type or protocol.

Point-of-sale server 120, as illustrated, includes a network interface 140 that communicates with point-of-sale terminals 110 using one or more messaging protocols. Network interface 140 can receive pricing search requests from point-of-sale terminals 110 and provide those pricing search requests to a processor 145 that provides a pricing object 150. Pricing object 150 can, for example, parse rule attributes and provide those attributes to rules-based database module 160 provided by the same processor 145 or a separate processor. Rules-based database module 160 can form searches or storage requests for the various rules attributes and provide those searches and storage requests to database storage 170 via a database communication interface 180. Pricing object 150 and rules-based database module 160 can provide results of the point-of-sale pricing request back to the appropriate point-of-sale terminal 110 via network 130.

Figure 2:
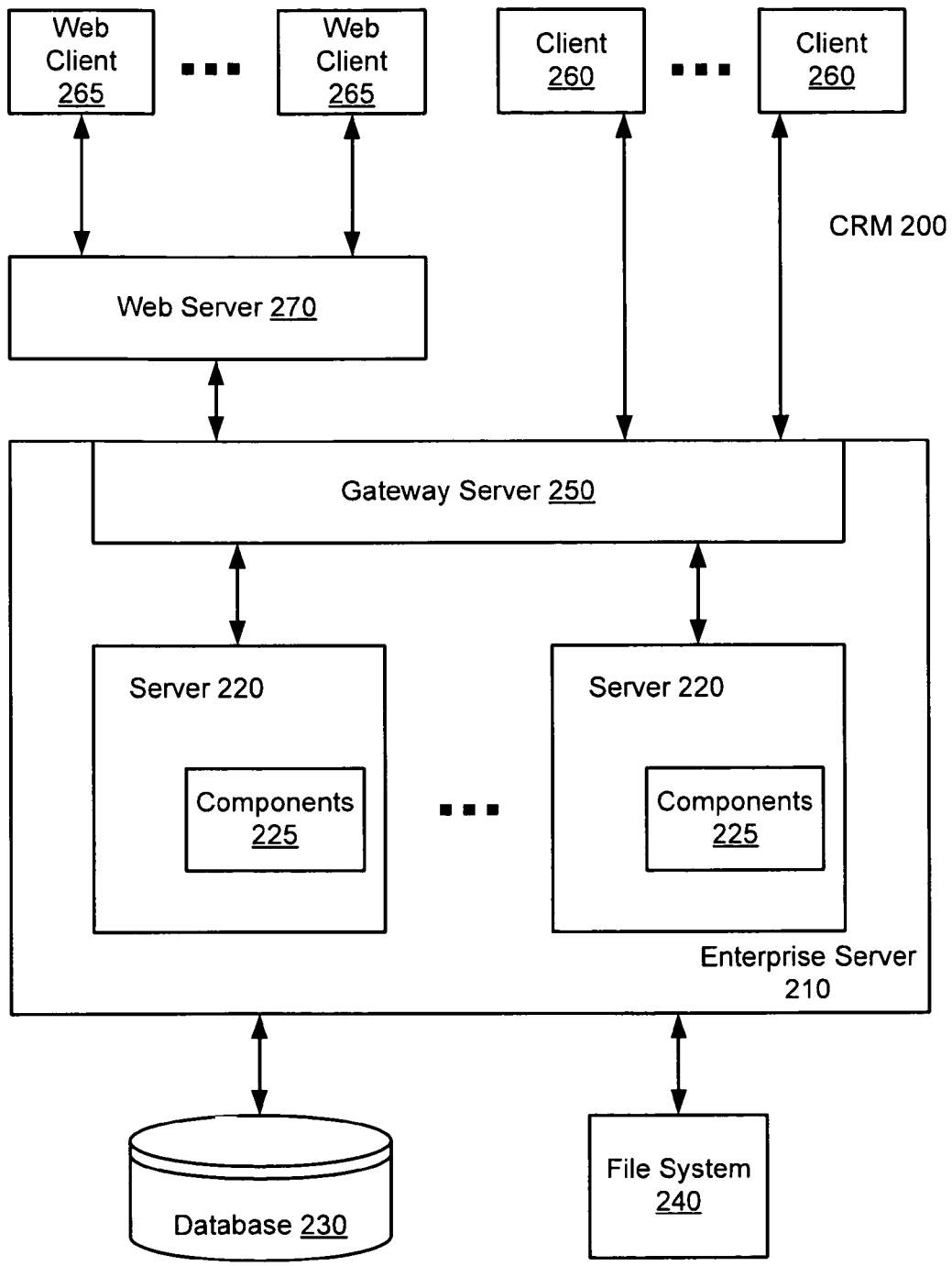
FIG. 2 is a simplified block diagram illustrating a customer relationship management architecture also usable in conjunction with embodiments of the present invention.

FIG. 2 is a simplified block diagram illustrating a customer relationship management architecture also usable in conjunction with embodiments of the present invention. The illustrated customer relationship management environment includes an enterprise server 210 that is a logical grouping of one or more servers 220 that support a group of clients (260, 265) accessing a common database 230. An enterprise server can be configured, managed and monitored as a single logical group, allowing an administrator to start, stop, monitor or set parameters for servers 220 within enterprise server 210. In such a configuration, parameters for the customer relationship management system can be set at the enterprise server level, and these parameters can apply to every server operating within the enterprise server. In addition, other parameters can be adjusted at a server (220) level to support fine tuning of those parameters. In this hierarchical parameter context, if a parameter is set at a server level, then the server-specific value for the parameter can override an enterprise server-level setting for the parameter. Further, parameter settings at a component level (processes executed on servers 220) will override those set at the server level.

Server 220 can support back-end and interactive processes for each client accessing the server. These processes are illustrated as one or more components 225 within each server. Examples of component processes include, for example, mobile web client synchronization, operation of business logic for web clients, connectivity and access to database and file system for clients, integration with legacy or third-party data (e.g., data not native to the CRM system), automatic assignment of new accounts, opportunities, service requests, and other records, and workflow management. Embodiments of rules-based decision-making modules can be associated with any of the component processes listed above. A server 220 can support, for example, multi-process and multi-threaded components, and can operate components in background, batch, and interactive modes. A server component can also operate on multiple servers 220 simultaneously to support an increased number of users or larger batched workloads.

Servers 220 are coupled to a gateway server 250 illustrated as part of enterprise server 210. Gateway server 250 can coordinate the operations of enterprise server 210 and servers 220. A gateway server can provide persistent storage of enterprise server configuration information, including, for example, definitions and assignments of component groups and components, operational parameters, and connectivity information. A gateway server can also serve as a registry for server and component availability information. For example, a server 220 within enterprise server 210 can notify gateway server 250 of availability. Connectivity information such as network addresses can be stored in a storage accessed by gateway server 250. If a server 220 shuts down or otherwise becomes unavailable, connectivity information related to that server can be cleared from gateway server 250.

Through their relationship in enterprise server 210, servers 220 and their components 225 access one or more databases 230 or file systems 240. CRM systems employing embodiments of the present invention can include as one or more components 225 the rules-based decision-making engine. Database 230 can store, for example, RDBMS client software and tables, indexes, and data related to all operations impacted by the CRM system. Database information can include the rules tables of embodiments of the present invention and, for example, customer information, market data, historical pricing information, current pricing information, contact information, and the like. Similarly, file system 240 can store data and physical files used by clients 260 and 265 and enterprise server 210. File system 240 can be a shared directory, or set of directories on different devices, which is network accessible to all servers 220 in enterprise server 210. In order for a client to gain access to files in file system 240, a client can connect to an appropriate server 220 to request file uploads or downloads. Server 220 can then access file system 240 using, for example, a file system management component.

As stated above, embodiments of the dynamic rules-based decision-making processes of the present invention can be implemented to execute on one or more of servers 220, accessing database 230 to store and retrieve data associated with the rules tables. An alternative embodiment provides a separate server accessible by the same or different web server. The separate server can provide access to database 230 or a copy thereof.

Clients 260 and 265 provide access to enterprise server 210 for agents using the customer relationship management system. Clients communicate to enterprise server 210 through gateway server 250 either directly (e.g., clients 260) or via a web server 270 (e.g., clients 265). A web server 270 can provide a mechanism by which enterprise server 210 can respond to web-based requests (e.g., HTML, XML, and the like). Web clients 265 can include clients coupled to web server 270 via a local area network, metro-area network or wide area network and propagated over a variety of communications media, as discussed above. Further, web clients 265 can include mobile clients accessing web server 270 through wireless communications means. Users of clients 260 and web clients 265 can include, for example, sales agents, service agents, customer representatives, managers of the business entity using the CRM, and the like.

As discussed above, a rules-based decision-making process incorporating embodiments of the present invention and executing in a customer relationship management environment of FIG. 2 can be used to provide, for example, pricing information, invoicing information, and rules-based scripting. A rules-based script can involve, for example, a script page having a set of questions whose responses are provided to a rules-based component of enterprise server 210. A rules attributes table can be searched using the response values to determine either an ultimate response based upon a rule or a subsequent set of questions to be asked, resulting in a next set of responses to be used as a search parameter for a subsequent search.

As discussed above, examples of rules attributes storage previously used included a fixed number of attribute columns for each rule and a fixed number of columns of particular data types. Such rules tables necessarily have wasted space due to every rule not having a set of attributes sufficient to fill each entry of the storage table. Further, since there are a fixed number of particular types of data for each set of attributes, the prior art rules attributes tables can be limiting as to the nature of the rules described by those tables. Embodiments of the present invention avoid these problems by generating a normalized table to contain the various rule attributes.

FIG. 3 illustrates an example of a prior art rules table that illustrates some of the deficiencies of the prior art. FIG. 3 illustrates a portion of a rules table containing 30 columns to store rule attribute parameters. Columns 310 are defined to store string values, columns 320 store numeric values, and columns 330 store date values. A rule identifier (RID) is stored in column 340. A rule identifier can be, for example, a primary key for the rule table. One example of a rule entry in the illustrated rule table is for RID 0. RID 0 includes pricing information for a large, red shirt valid for a date period starting at Jan. 1, 2000 and ending at Dec. 31, 2000. A result of searching on these rule attributes would be a determined price of $10.00. Similarly, RID 2 illustrates a pricing rule for denim pants over a period of Feb. 1, 2000 through Feb. 10, 2000. A result of a search including those parameters would provide a pricing of $31.00.

As can be seen from FIG. 3, not every rule entry contains values for each allocated attribute storage cell in the table. While some rules may include 30 attributes, the majority of the rules do not. But the additional space is allocated in order to store rules having a variable number of attributes (e.g., RID 2 having two string attributes and one numerical attribute as compared with RID 100 having three string attributes and two numerical attributes). Thus, this allocated space is wasted in a database storing the table illustrated in FIG. 3. Further, due to the sparse nature of the storage matrix of the rules table, it is difficult to generate an index that would permit rapid searching of the rules attributes. In addition, FIG. 3 illustrates a further limitation of many prior art rules tables in that each column of a particular data type is associated with one attribute. For example, the Str0 column includes an item attribute, while Str1 includes a color attribute and Str2 includes a size attribute, and the like.

FIGS. 4A and 4B illustrate an example of rules tables used by embodiments of the present invention. As discussed above, embodiments of the present invention provide two or more tables to store rule parameters. FIG. 4A is an illustration of a parent rules table that stores a parent rule identifier 410 and a rule header 420. Parent rule identifier 410 is the primary key to the parent rule table that consecutively numerates entries in the parent rules table and is typically generated by a database storing the parent rules table. Rule header 420 is a unique identifier for each rule entry. For example, the unique identifier can be a name for the rule plus a representation of date information for either when the rule was entered or the period of validity of the rule. The parent rules table of FIG. 4A contains entries for the rules illustrated in FIG. 3. For purposes of illustration, unique identifiers for each rule entry were generated using a number and the start dates illustrated from FIG. 3.

FIG. 4B is an illustration of an example rule details table that is associated with the parent rules table of FIG. 4A and contains some of the rule attributes previously illustrated in the table shown in FIG. 3. As illustrated, the rule details table of FIG. 4B contains six columns: rule details identifier (RDID) 430, parent rule identifier (PRID) 440, attribute identifier (AttrID) 445, and rule attributes columns for strings 450, numerical attributes 460, and date attributes 470. RDID column 430 is primary key for the rule details table generated by a database application storing the rule details table. Typically, RDID 430 will be sequentially numbered. PRID column 440 is a foreign key pointing back to the parent rule table entry for the associated rule. Thus, for example, entries in the rule details table for parent rule A001010100 (PRID=0) are RDID 0–5. Each rule entered in the parent rule table has as many entries in the rule details table as necessary to provide all the attributes of that rule. As can be seen, while the rule details table illustrated in FIG. 4B contains a larger numbers of entries than the rules table of FIG. 3, there is less wasted storage space in the rule details table of FIG. 4B because at most there are two columns in each entry that do not have a value.

An additional advantage of the rule details table, as illustrated by FIG. 4B, is that a searchable database index can be generated for each of columns 450, 460 and 470. Such a database index can be used to more quickly search through the entries of the rule details table to find those entries corresponding to a set of search parameters of interest (e.g., a description of an item for sale). In addition, a database index can also be generated for PRID column 440 to enhance a system's ability to search and find result entries for a particular rule, or to enhance a search for a specified rule entry to display all the attributes of that rule.

Attribute identifier (AttrID) column 445 defines the type of attribute the data in either of columns 450, 460 and 470 for each entry in the rule details table. By identifying the type of attribute in this manner, the rule details table eliminates the need to have multiple columns of each data type, each column associated with a particular type of attribute, as in the table illustrated in FIG. 3. In addition, the AttrID column also permits searching for rules based on the attribute identifier.

In addition to the index being generated, use and searching of the rule attributes table is enhanced through the use of metadata describing the nature of the data in each of the columns of the table. In addition, metadata can be used to describe the nature of the rules represented by a rules attributes table, as an alternative to inclusion of an AttrID column discussed above. For example, the rules attributes table illustrated in FIG. 4B is associated with rules that combine each attribute through the use of a Boolean AND operator. Alternative types of rules can involve other types of Booleans or results (e.g., OR, NOT EQUAL, GREATER THAN, LESS THAN, and the like). The nature of such operators can be included in the table metadata and can be examined in order to determine an appropriate rule attributes table to search. All the rules represented by a particular rules attributes table will then have the same set of operators determining the results.

Figure 5:
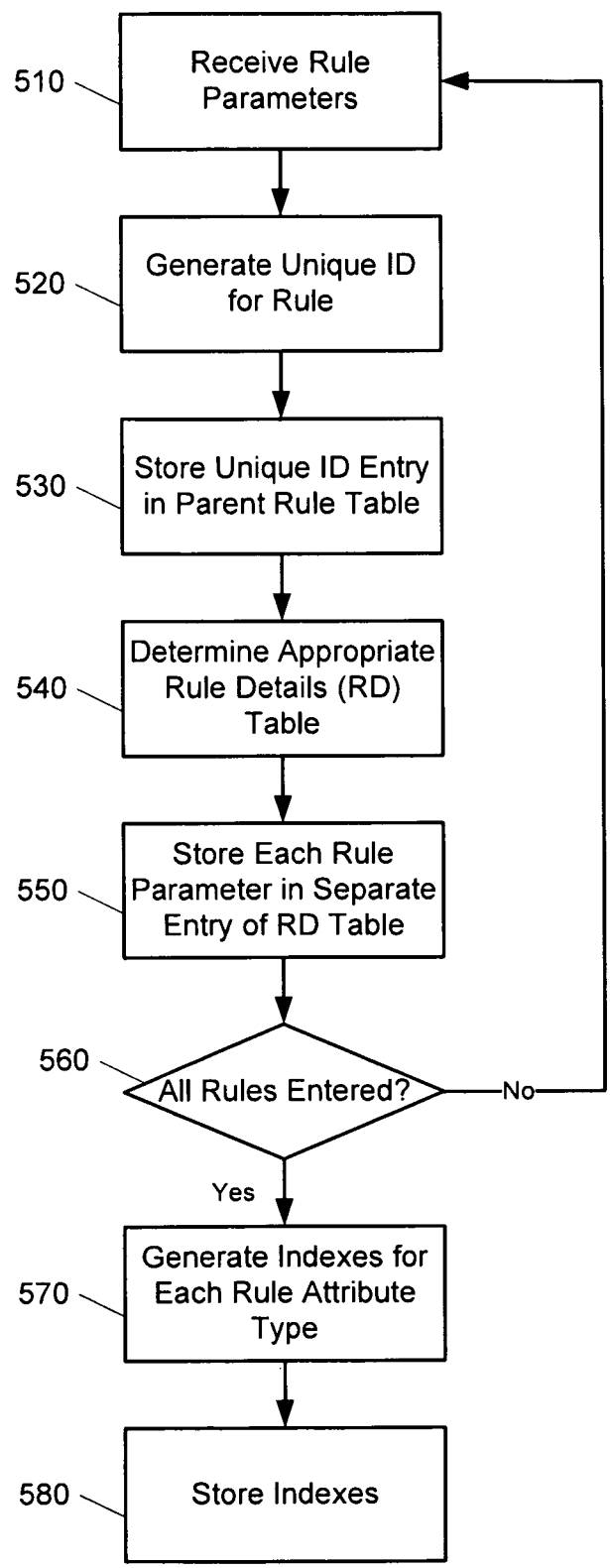
FIG. 5 is a simplified flow diagram illustrating steps performed to store rule parameters, in accord with embodiments of the present invention.

FIG. 5 is a simplified flow diagram illustrating steps performed to store rule parameters, in accord with embodiments of the present invention. Storing of rule parameters may be performed by, for example, a management level individual involved in the setting of rule policies. Systems providing embodiments of the present invention can provide a variety of user interfaces for the input of rule parameters. Interfaces can include, for example, drop down menus for various rule attributes, a natural language interface that provides for parsing of rule values from natural language input, and fill-in-the-blank type interfaces, and the like. Embodiments of the present invention are not limited by the mechanisms by which a system provides for input of the rule parameters.

Once the parameters for a rule have been received (510), a system can generate the unique identifier for the rule (520). As discussed above, the unique identifier can include any type of string or numerical value and is designed to uniquely identify a particular rule throughout a system so as to avoid any confusion between rules. Once generated, an entry containing the unique identifier can be stored in a parent rule table (e.g., FIG. 4A) (530). The system can then determine an appropriate rule details table in which to store the rule attributes (540). Such a determination can be based upon the nature of the rule, such as the subject matter of the rule or the type of rule (e.g., the operators used in describing the rule). The determination of the appropriate rule details table can be made in conjunction with examining metadata associated with each available rule details table. It should further be noted that rules tables and rules details tables can be separately stored based upon subject matter in order to decrease the size of any individual rules or rule details table. For example, automobile dealers might have separate rules or rules details tables to describe cars and trucks.

Once an appropriate rule details table has been selected, each parameter of the rule will be stored in a separate entry of the rule details table (550). Each entry in the rule details table can have a unique rule detail identifier (e.g., 430) and also a foreign key referencing the parent rule identifier from the parent rule table (e.g., PRID 440).

A determination can then be made as to whether all the rules of interest have been entered (560), and if not, then the system can be prepared to receive additional rule parameters. If all the rules have been entered, then database indexes can be generated for each rule attribute type (570). In one embodiment of the present invention, a database index can be generated for each of string column 450, number column 460 and date column 470 of FIG. 4B. Additionally, if a particular set of entries in the rule details table is known to be of repeated interest (e.g., shirts), then a database index can be generated specifically for that set of entries. Generation of additional database indexes for the rules details table can be based upon the needs of the business entity using the rules-based system. Such database indexes can be used to improve efficiency of searches of the rule details table, as discussed above. Once generated, the system can store the various database indexes in a manner that makes them available to the system using the rule-based decision making (580). In alternative embodiments, the database indexes can be generated and stored as each entry is stored in the rule details table. Database indexes can be generated by indexing functionality of the database within which the rule details table is stored.

Once the parent rules table and the various rules details tables have been generated, the tables can then be used by the associated system, as needed. For example, searches can be performed upon request to require results for particular rules associated with an item needing to be priced. As another example, all rules related to a particular area can be searched for and displayed for administrative purposes.

Figure 6:
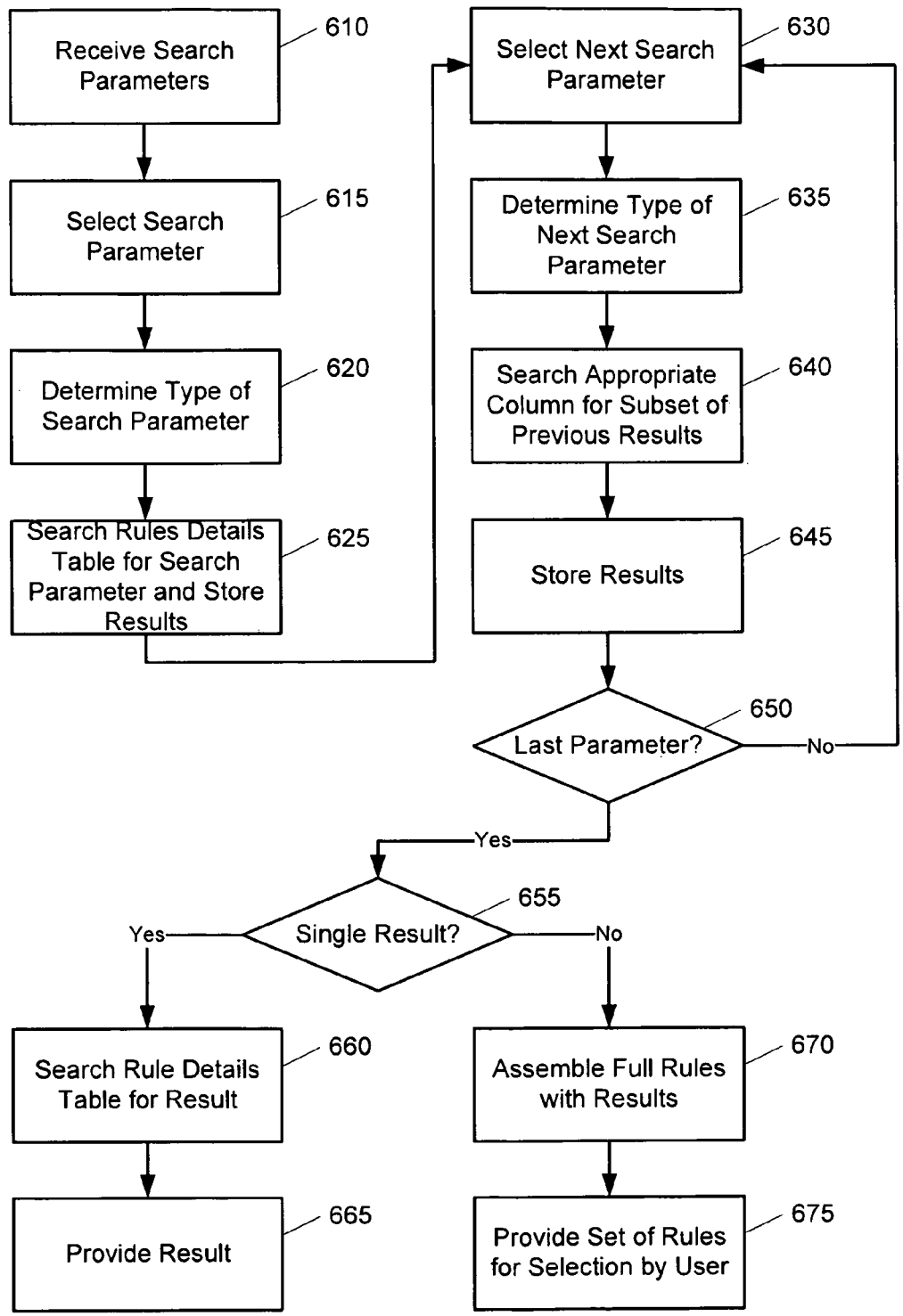
FIG. 6 is a simplified flow diagram illustrating steps performed by a system involved in searching for a rule or results of the rule, in accord with embodiments of the present invention.

FIG. 6 is a simplified flow diagram illustrating steps performed by a system involved in searching for a rule or results of the rule. Search parameters can be received, for example, from a point-of-sale terminal or a client (610). The received search parameters correspond to rule attributes in the rule attribute table. A first search parameter is then selected (615). Determination of which search parameter to choose for the initial search can be based upon a variety of criteria or a random selection. Such criteria can include, for example, whether a database index has been generated for the search parameter. Since index searches will be more efficiently performed, a logical choice of a search parameter is one related to a database index that has already been generated. A type of search parameter can then be determined (620), which then determines the appropriate column to perform the search on in the rule details table. The rules details table can then be searched for matches to the search parameter (625). If a database index has been generated for the search parameter, the index can alternatively be searched for matches for the search parameter. A parent rule identifier (e.g., PRID 440) of each entry having a match to the search parameter of interest is then retained or stored for further refining of the search.

The search is continued by selecting a next search parameter (630), determining the type of the next search parameter (635), and searching an appropriate column of the entries having the previously retained parent rule identifiers or an index thereof (640). Results of the search for this next search parameter can be stored or retained (645). If all the search parameters have not been searched (650), then the process of searching subsequent search parameters is continued.

If the last parameter has been searched, then a determination is made as to whether a single rule entry is represented by the results of the searches (655). If so, then the rule details table can be searched for the result of the rule (660) (e.g., by searching for a result entry corresponding to the parent rule I.D.). The result is then provided (665). If a single result to the search is not found, then one embodiment of the present invention can assemble the full set of rules with attributes and results (670). The set of rules can then be provided to a user for selection of the appropriate rule (675).

Implementation of the rules-based decision making system discussed above offers several advantages over previous solutions. Previous solutions were limited to a maximum of a set number of dimensions and a set number of each type of data for each rule. Through the normalization of rule detail information and joining that with structure metadata, embodiments of the present invention remove fixed limits on the number of attributes that can be stored in a rule details table. Further, no limit exists for each type of data, thereby allowing truly variable proportions of string, to number, to date attribute dimensions. Impossible matrix setups of previous solutions, such as one that uses the maximum number of dimensions but of all one type of data, is now possible using this approach.

Further, normalization of rule details produces a rule details table with fixed column format to store key-value attribute pairs. An advantage of this column format over previous data models is that a practical number of database indexes can be created on this table to aid during runtime search. Previous rule tables provide, for example, 30 columns for which creating and maintaining indexes for each of these columns hampers performance. With the fixed column format of embodiments of the present invention, the number of index columns is small, and the column positions in the table are predefined through the table metadata.

Thus, embodiments of the present invention provide flexibility and potential improvement to performance. Less space is required for the storage of rules tables and indexes allowing fast searches are provided.

An Example Computing And Network Environment

As shown above, the present invention can be implemented using a variety of computer systems and networks. An example of one such computing and network environment is described below with reference to FIGS. 7 and 8.

Figure 7:
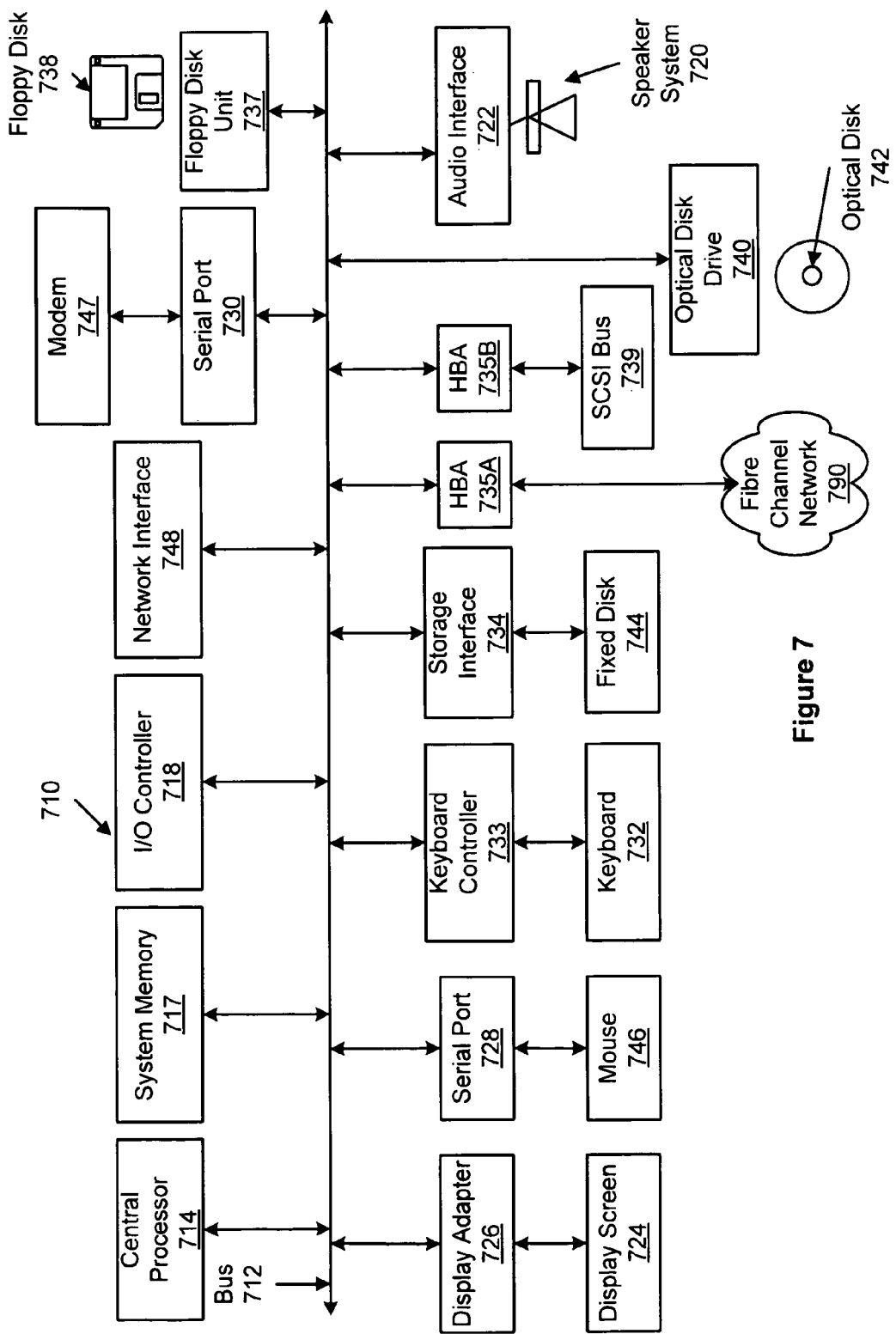
FIG. 7 is a simplified block diagram of a computer system suitable for implementing aspects of the present invention.

FIG. 7 depicts a block diagram of a computer system 710 suitable for implementing aspects of the present invention (e.g., point-of-sale terminals 110, server 120, clients 260, web clients 265, and servers 220 and 270). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
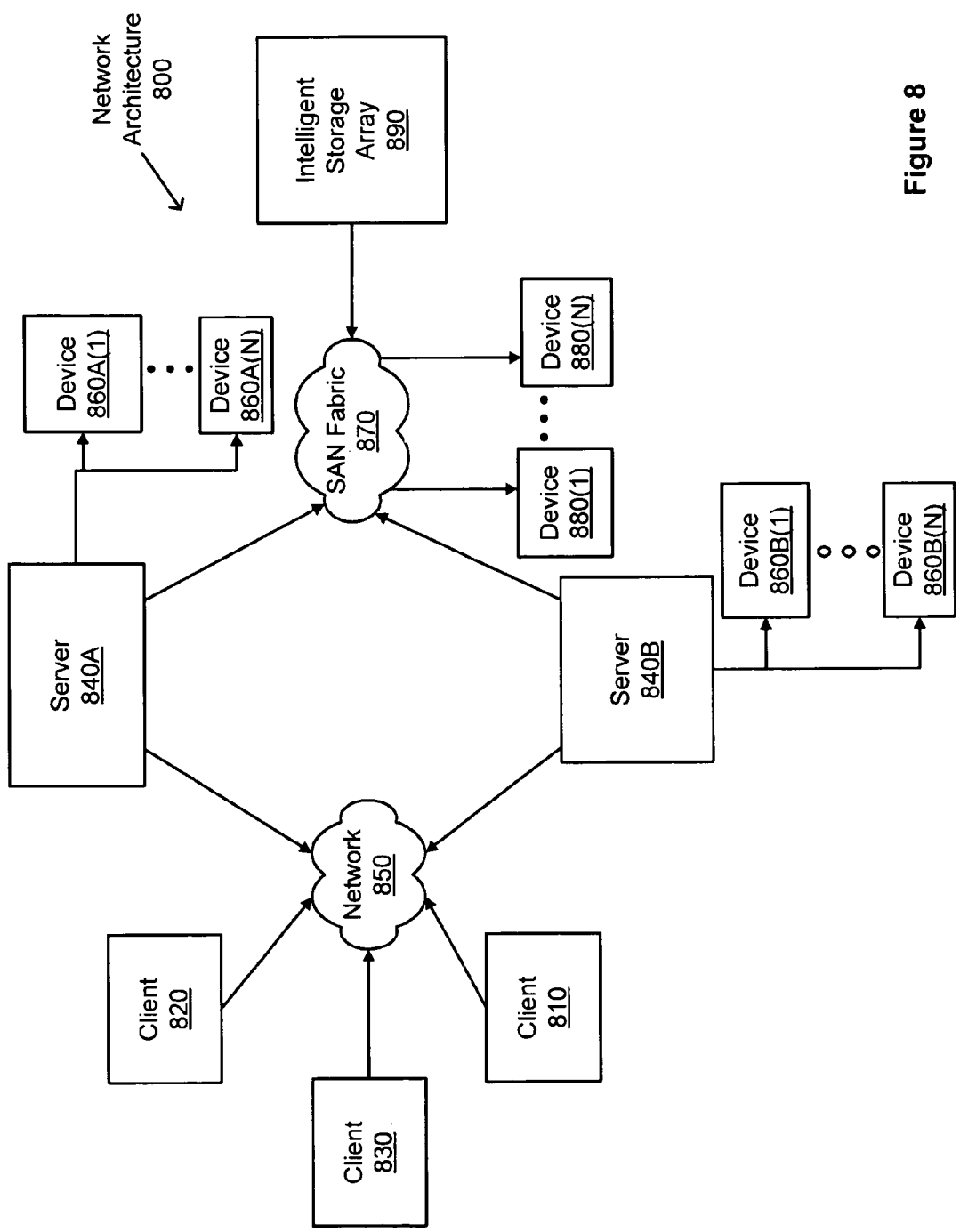
FIG. 8 is a simplified block diagram of a network architecture suitable for implementing embodiments of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
for each rule of a plurality of rules,
generating a parent rules table entry of a plurality of parent rules table entries in a parent rules table, wherein
the each rule of the plurality of rules is represented by a corresponding parent rules table entry of the plurality of parent rules table entries in the parent rules table,
generating one or more rule details table entries of a plurality of rule details table entries in a rule details table, wherein
each rule details table entry of the plurality of rule details table entries comprises
a plurality of attribute type fields, wherein
only one of the plurality of attribute type fields comprises
a rule attribute value, and
associating the parent rules table entry and the one or more rule details table entries with one another;
generating a search index for each attribute type field of the plurality of attribute type fields;
the searching uses
one or more search parameters, and
one or more search indices of the plurality of search indices, and
the searching comprises
determining whether one or more rule details table entries of the plurality of rule details table entries comprise one or more attribute values that match the one or more search parameters; and
if the determining indicates that the one or more rule details table entries comprise the one or more attribute values that match the one or more search parameters, identifying a rule of the plurality of rules using an association between the one or more rule details table entries and a corresponding one of the plurality of parent rules table entries.

2. The computer-implemented method of claim 1, wherein the each rule details table entry further comprises:

allocated space for values of one each of a plurality of data types, wherein
each of the plurality of data types corresponds to a corresponding one of the plurality of attribute types, and
a single attribute identifier column is generated in the rule details table, wherein
the single attribute identifier column defines one or more types of a plurality of types of attribute data comprised in the plurality of attribute type fields.

3. The computer-implemented method of claim 2, wherein the plurality of data types comprises
one string data type,
one numerical data type, and
one date data type,
the each rule details table entry further comprises
an attribute identifier configured to identify a data type of the one rule attribute value of the each rule details table entry, and
the data type identified by the attribute identifier of the each rule details table entry is one of the plurality of data types.

4. The computer-implemented method of claim 1, wherein the each rule details table entry of the plurality of rule details table entries further comprises
a foreign key,
the foreign key of the each rule details table entry references one of the corresponding parent rules table entries,
the identifying uses at least one of the foreign keys of the one or more rule details table entries,
the at least one of the foreign keys of the one or more rule details table entries reference a corresponding one of the plurality of parent rules table entries that corresponds to the rule,
each of the plurality of parent rules table entries comprises
a parent rule identifier, and
a rule header configured to uniquely identify the each of the plurality of parent rules table entries,
the foreign key of the each rule details table entry corresponds to a primary key of the each of the plurality of parent rule table entries,
the parent rule identifier of the each of the plurality of parent rules table entries is the primary key of the each of the plurality of parent rule table entries, and
the each rule details table entry of the plurality of rule details table entries further comprises
a rule details identifier configured as a primary key for the rules detail table.

5. The computer-implemented method of claim 4, wherein
each rule of the plurality of rules is represented by a corresponding parent rules table entry of the plurality of parent rules table entries, and
the each of the corresponding parent rules table entries further comprises
a unique identifier configured to identify the each rule of the plurality of rules.

6. The computer-implemented method of claim 4, wherein the
searching comprises:
selecting a first parameter of the one or more search parameters; and
identifying a parent rule identifier of a parent rules table entry, wherein
the parent rules table entry is referenced by a foreign key of a rule details table entry comprising an attribute value that matches the first parameter.

7. The computer-implemented method of claim 6, wherein the searching further comprises:
selecting a second parameter of the one or more search parameters, wherein
the identifying the parent rule identifier identifies a plurality of parent rule identifiers,
the parent rule identifiers comprise another parent rule identifier, and
another parent rules table entry comprises the another parent rule identifier; and
identifying the another parent rule identifier, wherein
the another parent rules table entry is referenced by another foreign key of another rule details table entry comprising an attribute value that matches the second parameter.

8. An apparatus comprising:
a network interface configured to receive a search request from a remote node, wherein
the search request comprises one or more search parameters;
a processor, coupled to the network interface, and configured to
for each rule of a plurality of rules,
generate a parent rules table entry of a plurality of parent rules table entries in a parent rules table, wherein
the each rule of the plurality of rules is represented by a corresponding parent rules table entry of the plurality of parent rules table entries in the parent rules table,
generate one or more rule details table entries of a plurality of rule details table entries in a rule details table, wherein
each rule details table entry of the plurality of rule details table entries comprises
a plurality of attribute type fields, wherein
only one of the plurality of attribute type fields comprises
a rule attribute value, and
associate the parent rules table entry and the one or more rule details table entries with one another;
generate a search index for each attribute type field of the plurality of attribute type fields,
receive the search request from the network interface,
search a rule details table, wherein
the processor is configured to search using
the one or more search parameters, and
one or more search indices of the plurality of search indices, and
the processor is configured to search by virtue of being configured to
determine whether one or more rule details table entries of the plurality of rule details table entries comprise one or more attribute values that match the one or more search parameters; and
identify a rule of the plurality of rules using an association between the one or more rule details table entries and a corresponding one of the plurality of parent rules table entries, if the one or more rule details table entries comprise the one or more attribute values that match the one or more search parameters; and
a database communication interface, wherein
the database communication interface is coupled to the processor, and
the database communication interface is configured to provide access to a database comprising the rule details table and the parent rules table.

9. The apparatus of claim 8, wherein the each rule details table entry further comprises:
   allocated space for values of one each of a plurality of data types, wherein
      each of the plurality of data types corresponds to a corresponding one of the plurality of attribute types.

10. The apparatus of claim 9, wherein
   the plurality of data types comprises
      one string data type,
      one numerical data type, and
      one date data type,
   the each rule details table entry further comprises
      an attribute identifier configured to identify a data type of the one rule attribute value of the each rule details table entry, and
   the data type identified by the attribute identifier of the each rule details table entry is one of the plurality of data types.

11. The apparatus of claim 8, wherein
   the each rule details table entry of the plurality of rule details table entries further comprises
      a foreign key,
   the foreign key of the each rule details table entry references one of the corresponding parent rules table entries,
   the identifying uses at least one of the foreign keys of the one or more rule details table entries,
   the at least one of the foreign keys of the one or more rule details table entries reference a corresponding one of the plurality of parent rules table entries that corresponds to the rule,
   each of the plurality of parent rules table entries comprises
      a parent rule identifier, and
      a rule header configured to uniquely identify the each of the plurality of parent rules table entries,
   the foreign key of the each rule details table entry corresponds to a primary key of the each of the plurality of parent rule table entries,
   the parent rule identifier of the each of the plurality of parent rules table entries is the primary key of the each of the plurality of parent rule table entries, and
   the each rule details table entry of the plurality of rule details table entries further comprises
      a rule details identifier configured as a primary key for the rules detail table.

12. The apparatus of claim 11, wherein
   each rule of the plurality of rules is represented by a corresponding parent rules table entry of the plurality of parent rules table entries, and
   the each of the corresponding parent rules table entries further comprises a unique identifier configured to identify the each rule of the plurality of rules.

13. The apparatus of claim 11, wherein the processor is configured to search the rules table by virtue of the processor being further configured to:
   select a first parameter of the search request; and
   identify a parent rule identifier of a parent rules table entry, wherein
      the parent rules table entry is referenced by a foreign key of a rule details table entry comprising an attribute value that matches the first parameter.

14. The computer-implemented method of claim 13, wherein the processor is configured to search the rules table by virtue of the processor being further configured to:
   select a second parameter of the search request, wherein
      the identifying the parent rule identifier identifies a plurality of parent rule identifiers,
      the parent rule identifiers comprise another parent rule identifier, and
      another parent rules table entry comprises the another parent rule identifier; and
   identify the another parent rule identifier, wherein
      the another parent rules table entry is referenced by another foreign key of another rule details table entry comprising an attribute value that matches the second parameter.

15. A computer-readable storage medium storing instructions executable by a processor, the instructions comprising:
   a first set of instructions configured to, for each rule of a plurality of rules,
      generate a parent rules table entry of a plurality of parent rules table entries in a parent rules table, wherein
         the each rule of the plurality of rules is represented by a corresponding parent rules table entry of the plurality of parent rules table entries in the parent rules table,
      generate one or more rule details table entries of a plurality of rule details table entries in a rule details table, wherein
         each rule details table entry of the plurality of rule details table entries comprises
            a plurality of attribute type fields, wherein
               only one of the plurality of attribute type fields comprises a rule attribute value, and
      associate the parent rules table entry and the one or more rule details table entries with one another;
   a second set of instructions configured to generate a search index for each attribute type field of the plurality of attribute type fields;
   a third set of instructions configured to search a rule details table for one or more entries,
      wherein the third set of instructions are configured to use
         one or more search parameters, and
         one or more search indices of the plurality of search indices, and
      the third set of instructions comprises
         a first subset of instructions configured to determine whether one or more rule details table entries of the plurality of rule details table entries comprise one or more attribute values that match the one or more search parameters; and
   a fourth set of instructions configured to identify a rule of the plurality of rules using an association between the one or more rule details table entries and a corresponding one of the plurality of parent rules table entries, if the second set of instructions indicates that the one or more rule details table entries comprise the one or more attribute values that match the one or more search parameters.

16. The computer-readable storage medium of claim 15, wherein the each rule details table entry further comprises:
   allocated space for values of one each of a plurality of data types, wherein
      each of the plurality of data types corresponds to a corresponding one of the plurality of attribute types.

17. The computer-readable storage medium of claim 16, wherein
   the plurality of data types comprises
      one string data type,
      one numerical data type, and
      one date data type,
   the each rule details table entry further comprises an attribute identifier configured to identify a data type of the one rule attribute value of the each rule details table entry, and the data type identified by the attribute identifier of the each rule details table entry is one of the plurality of data types.

18. The computer-readable storage medium of claim 15, wherein the each rule details table entry of the plurality of rule details table entries further comprises
a foreign key, the foreign key of the each rule details table entry references one of the corresponding parent rules table entries, the identifying uses at least one of the foreign keys of the one or more rule details table entries, the at least one of the foreign keys of the one or more rule details table entries reference a corresponding one of the plurality of parent rules table entries that corresponds to the rule, each of the plurality of parent rules table entries comprises
a parent rule identifier, and
a rule header configured to uniquely identify the each of the plurality of parent rules table entries, the foreign key of the each rule details table entry corresponds to a primary key of the each of the plurality of parent rule table entries, the parent rule identifier of the each of the plurality of parent rules table entries is the primary key of the each of the plurality of parent rule table entries, and the each rule details table entry of the plurality of rule details table entries further comprises
a rule details identifier configured as a primary key for the rules detail table.

19. The computer-readable storage medium of claim 18, wherein the third set of instructions comprises:
a fifth set of instructions configured to select a first parameter of the one or more search parameters; and
a sixth set of instructions configured to identify a parent rule identifier of a parent rules table entry, wherein
the parent rules table entry is referenced by a foreign key of a rule details table entry comprising an attribute value that matches the first parameter.

20. The computer-readable storage medium of claim 19, wherein the third set of instructions further comprises:
a seventh set of instructions configured to select a second parameter of the one or more search parameters, wherein
the identifying the parent rule identifier identifies a plurality of parent rule identifiers,
the parent rule identifiers comprise another parent rule identifier, and
another parent rules table entry comprises the another parent rule identifier; and
a eighth set of instructions configured to identify the another parent rule identifier, wherein
the another parent rules table entry is referenced by another foreign key of another rule details table entry comprising an attribute value that matches the second parameter.

21. The computer-implemented method of claim 1, further comprising:
if the determining indicates that one rule details table entry comprises the one or more attribute values that match the one or more search parameters,
performing the identifying, wherein
the identifying identifies one rule, and
the one rule is another of the plurality of rules that are represented by the plurality of parent rules table entries in the parent rules table.

22. The computer-implemented method of claim 21, further comprising:
if the determining indicates that a plurality of rule details table entries comprises the one or more attribute values that match the one or more search parameters,
assembling the plurality of rule details table entries, and
presenting the plurality of rule details table entries, wherein
the presenting facilitates selection of one or more of the plurality of rule details table entries by a user.

* * * * *